(12) United States Patent
Ferguson et al.

(10) Patent No.: US 10,069,817 B2
(45) Date of Patent: Sep. 4, 2018

(54) SECURE FILE TRANSFER WITH SECURE SSH KEY AUTHENTICATION

(71) Applicant: MasterCard International Incorporated, Purchase, NY (US)

(72) Inventors: Douglas Paul Ferguson, Richmond Heights, MO (US); Sachin Kumar Rathore, Pune (IN); Uday Kumar Survi, Dardenne Prarie, MO (US); Steven Delles, Bridgeton, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 42 days.

(21) Appl. No.: 14/867,253

(22) Filed: Sep. 28, 2015

(65) Prior Publication Data

US 2017/0093840 A1 Mar. 30, 2017

(51) Int. Cl.
*H04L 29/06* (2006.01)
*G06Q 20/10* (2012.01)
*G06F 21/62* (2013.01)

(52) U.S. Cl.
CPC ........ *H04L 63/083* (2013.01); *G06F 21/6209* (2013.01); *G06Q 20/108* (2013.01); *H04L 63/0428* (2013.01)

(58) Field of Classification Search
CPC .... H04L 63/083; H04L 63/0423; H04L 67/06
See application file for complete search history.

(56) References Cited

U.S. PATENT DOCUMENTS

2015/0222604 A1* 8/2015 Ylonen ................. H04L 63/062
713/171

FOREIGN PATENT DOCUMENTS

WO 2007044964 A2 4/2007
WO 2013093209 A1 6/2013

OTHER PUBLICATIONS

John Carl Villaneuva, What is an SFTP key?, Dec. 9, 2014, pp. 1-5, retrieved from the Internet: URL: www.jscape.com/blog/what-is-an-sftp-key, retrieved on Nov. 21, 2016.
Patent Cooperation Treaty, International Search Report for PCT/US2016/053270, dated Dec. 2, 2016, pp. 1-5.

* cited by examiner

*Primary Examiner* — Dao Q Ho
(74) *Attorney, Agent, or Firm* — Sheppard Mullin Richter & Hampton LLP (57) ABSTRACT

An application having an application architecture including an application programming interface (API) client capable of automatically retrieving a passphrase from a secure passphrase vault based on a user authentication ID used to access the application is provided. The passphrase is used to access a secure file transfer protocol (SFTP) authentication key via an API server communicatively connected to the API client. The SFTP authentication key is used to authenticate an SFTP file transfer request from the application to an intended file recipient.

9 Claims, 6 Drawing Sheets

SECURE FILE TRANSFER WITH SECURE SSH KEY AUTHENTICATION

TECHNICAL FIELD

The present disclosure is generally related to secure file transfer. More particularly, the present disclosure is directed to systems and methods for supporting secure file transfer using secure SSH key authentication.

BACKGROUND

Applications utilized by industry entities, businesses, and the like often rely on enterprise file transfer solutions to exchange data files with other entities, such as customers. Generally, such applications use a vendor-provided file transfer solution to submit data files to and retrieve data files from the enterprise file transfer solution. The enterprise file transfer solution may then proceed with the actual exchange of data files with the customers. For example, and in the context of payment networks, data files associated with electronic payment transaction clearing, settlement, payment card rewards, etc. are exchanged between the payment network applications and payment network customers, which can be payment card issuing banks, acquiring banks, merchants, etc.

SUMMARY

In accordance with one embodiment, a method comprises obtaining a passphrase to authenticate a secure file transfer of a file, and establishing a first connection with a first server having access to an authentication key, wherein access to the authentication key is based upon the passphrase. Furthermore, the method comprises establishing a second connection with a second server using the authentication key to initiate the secure file transfer of the file between the second server and a file recipient.

In accordance with a second embodiment, a method comprises receiving a file transfer request and validating parameters for initiating the file transfer request including a file transfer authentication key and a passphrase for accessing the file transfer authentication key. Upon determining existence of the passphrase and authentication key, the method further comprises providing the passphrase and authentication key to a file transfer server to authenticate the file transfer request.

In accordance with a third embodiment, an application server comprises a secure file transfer protocol (SFTP) remote method invocation (RMI) client component, and a vault accessible by the SFTP RMI client to obtain a passphrase for authenticating a file transfer request by the application server. The application server further comprises an SFTP RMI server, and a secure authentication key store from which the SFTP RMI server obtains an authentication key based on the obtained passphrase.

BRIEF DESCRIPTION OF THE DRAWINGS

Further aspects of the present disclosure will be more readily appreciated upon review of the detailed description of its various embodiments, described below, when taken in conjunction with the accompanying drawings.

The drawings are described in greater detail in the description and examples below. The drawings are not intended to be exhaustive or to limit the various embodiments to the precise form disclosed. It should be understood that embodiments can be practiced with modification and alteration.

DETAILED DESCRIPTION

The details of some example embodiments of the methods and systems of the present disclosure are set forth in the description below. Other features, objects, and advantages of the disclosure will be apparent upon examination of the following description, drawings, examples and claims. It is intended that all such additional systems, methods, features, and advantages be included within this description, be within the scope of the present disclosure, and be protected by the accompanying claims.

As alluded to above, vendor-provided file transfer solutions are often utilized to submit data files to and retrieve data files from an enterprise file transfer solution. However, conventional file transfer systems are unable to provide batch transfers of data files in a secure manner. That is, in the context of payment network clearing/settlement processing, data is generally created and transferred according to some regular schedule, for example, daily. The transferring of such data must currently be performed manually.

Moreover, certain file transfer mechanisms, one example of which is the file transfer protocol (FTP), are unacceptable due to their lack of security with regard to file transfer sessions. FTP Secure (FTPS) adds security, but is difficult to support with hierarchical trust relations and multi-port connectivity requirements. Another known mechanism for transferring files, i.e., secure file transfer protocol or Secure Shell (SSH) file transfer protocol (SFTP) is desirable for use given that it is standardized protocol for secure file transfer that can be implemented in a variety of different operating systems (OSs) and/or application environments or platforms. SFTP is available as a utility program and as a programming library, but neither offering addresses access control over passwords or SSH key passphrases.

Further regarding SFTPs use of one of two authentication modes or forms of authentication (password-based authentication and key-based authentication (SSH key passphrases), a key may be thought of as something, e.g., a user "has" or possesses, while a password is something the user "knows." Because passwords are generally more easily compromised, for example, by guessing or by managing to view the password, key-based authentication in SFTP, where an SSH key is required in order to an SFTP client to connected to an SFTP server to engage in a secure file transfer, is preferable. However, use of an SSH key requires some form of user interaction, i.e., a user is required to manually enter the key and/or store the key in a less-than-secure manner somewhere in the proximity of the SFTP server. Passphrase protecting the SSH key also requires user interaction in order to unlock the key prior to initiating some file transfer. That is, vaults exist which may be able to securely store tokens, such as the passphrase, but no conventional technology allows for the automatic lookup of the passphrase to be applied to access a private SSH key.

Accordingly, various embodiments are directed to a system and method of secure file transfer, where a passphrase can automatically be obtained from a secure vault, and used to retrieve an SSH key for use in initiating a file transfer. In particular, a vault can be used to securely store passphrases, where access to the vault is controlled by, e.g., a single sign-on identity that can be configured (pre-associated) to provide access to such passphrase(s) appropriate for that sign-on identity to have. Once a user has authenticated him/herself with an application or application server, operating system, etc., that single sign-on identity (also referred to as an application user ID) can be used to access the passphrase(s) stored in the vault. Once the passphrase is obtained, the passphrase can be used to retrieve the appropriate SSH key to effectuate a file transfer using SFTP. In other words, various embodiments couple the use of an authentication identity to access a secret passphrase, which in turn, can be utilized so that a passphrase protected SSH key can be used to authenticate a file transfer that has been requested by the user/application.

As discussed previously, one example of an industry in which applications requiring secure file transfers are used is the payment transaction processing industry. Transaction processing of card-based payments can include both an authorization side and a clearance side. The authorization side may involve the process of confirming that a cardholder has a sufficient line of credit to cover a proposed payment. The clearance side of the transaction may involve the process of moving funds from an issuing bank to an acquiring merchant bank.

In the context of payment transaction processing, large numbers and/or batches of files and data (e.g., money files, rewards files, settlement clearing data, etc.) may be transferred between the payment network and its customers (e.g., to and from banks, merchants, etc.) as will be described in greater detail below. In order to effectuate the transfer of these files, an entity such as the payment network itself may customize web applications, or utilize proprietary frameworks/software such as secure transport managed file transfer software (MFTS).

Figure 1:
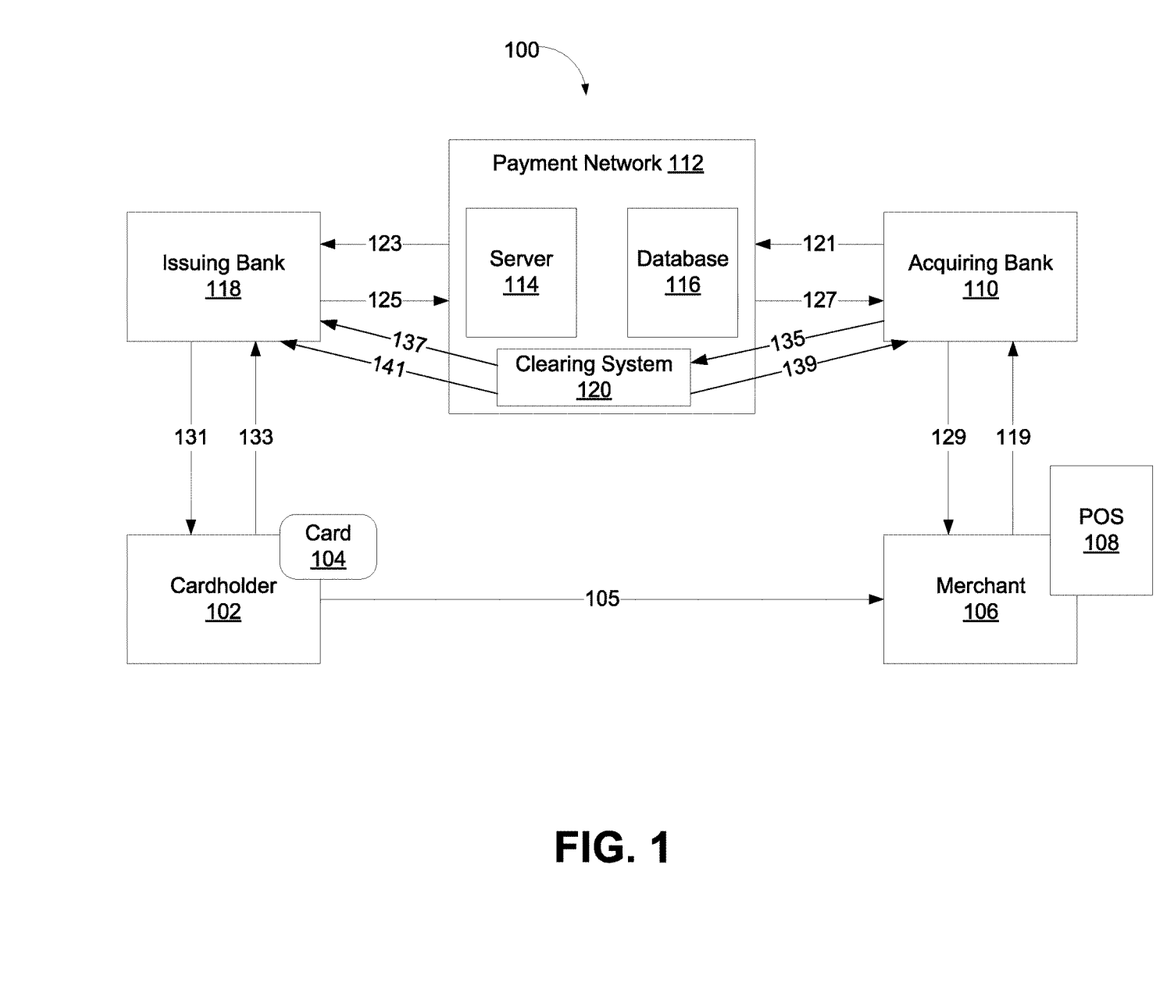
FIG. 1 illustrates an example payment card transaction processing system.

An example of a network and contextual environment in which various embodiments may be applicable will be illustrated and described. FIG. 1 depicts an example payment card transaction processing system 100 in which an application having a segmented architecture may be implemented in accordance with various embodiments.

In a typical card-based payment transaction system, a cardholder 102 presents a credit/debit/prepaid card 104 to a merchant 106 for the purchase of goods and/or services. This transaction is indicated by arrow 105. A "card" 104, as used herein, can refer to a conventional magnetic-stripe credit, debit card, or similar proximity payment device (utilized on its own or incorporated into another device such as a mobile telephone, personal digital assistant (PDA), etc.) having near field communications (NFC) capabilities, such as a radio frequency identification (RFID) chip implemented therein. A "card" can further refer to virtual or limited use account numbers and electronic wallets.

It is understood that prior to the occurrence of such a transaction, cardholder 102 was issued card 104 by an issuing bank 118. Moreover, it will be understood that merchant 106 has established a relationship with an acquiring bank 110, thereby allowing merchant 106 to receive payment cards as payment for goods and/or services. That is, merchant banks and issuing banks may participate in various payment networks, including payment network 112. One such payment network is the one operated by MasterCard International Incorporated, the assignee of the present disclosure.

After presentation of payment card 104 to merchant 106 by cardholder 102, merchant 106 may send an authorization request (indicated by arrow 119) to acquiring bank 110 via a point-of sale (POS) terminal 108 located at or otherwise controlled by merchant 106. In turn, acquiring bank 110 communicates with payment network 112 (indicated by arrow 121), and payment network 112 communicates with issuing bank 118 (indicated by arrow 123) to determine whether issuing bank 118 will approve the transaction 105 that cardholder 102 is attempting to make. An approval or disapproval of the authorization request is thereafter transmitted back to merchant 106 (indicated by arrows 125, 127 and 129). Merchant 106 may then either complete or cancel transaction 105 based upon the response to the authorization request.

If transaction 105 is approved, the transaction amount will be sent from issuing bank 118 through payment network 112 to acquiring bank 110. The transaction amount, minus certain fees, will thereafter be deposited within a bank account belonging to merchant 106. Issuing bank 118 may then bill cardholder 102 (indicated by arrow 131) for the transaction amount by sending a periodic cardholder statement. Cardholder 102 follows by submission of payment(s) (as indicated by arrow 133) to issuing bank 118. This submission of payment(s) (as indicated by arrow 133) by cardholder 102 may be automated (e.g., in the case of debit transactions), may be initiated by cardholder 102 for the exact amount matching the total cost of all purchases during the statement period (e.g., charge cards or credit balances paid in full), and/or may be submitted (in part or in whole) over a period of time that thereby reflects the costs of the purchases plus any financing charges agreed upon beforehand between cardholder 102 and issuing bank 118 (e.g., revolving credit balances).

Payment network 112 preferably includes at least one server 114 and at least one database 116. Server 114 may include various computing devices such as a mainframe, personal computer (PC), laptop, workstation or the like. Server 114 can include a processing device and be configured to implement an authorization and clearance process, which can be stored in computer storage associated with server 114. Database 116 may include computer readable medium storage technologies such as a floppy drive, hard drive, tape drive, flash drive, optical drive, read-only memory (ROM), random access memory (RAM), and/or the like. Server 114 and database 116 may be controlled by software/hardware and may store data to allow it to operate in accordance with aspects of the present disclosure.

POS terminal 108 is in data communication, directly or indirectly, and at least from time to time, with, e.g., an acquirer host computer (not shown) that is part of payment network 112 and is operated for or on behalf of acquiring bank 110, which handles payment card transactions for merchant 106. Server 114 may be operated by or on behalf of the payment network 112, and may provide central switching and message routing functions among the member financial institutions of the payment card association. Issuing bank 118 also preferably makes use of an issuer host computer (not shown), and an access point (not shown) via which the issuer host computer exchanges data messages with server 114. It should be noted that in practice, payment card transaction processing system 100 may involve a large number of cardholders, POS terminals, acquirer host computers, issuer host computers, and access points. In general, the acquirer host computer can receive authorization requests from POS terminals, forward the authorization requests through payment network 112, receive authorization responses, and relay the authorization responses to POS terminal 108. Moreover, the issuer host computer may in general, receive authorization requests from server 114 and transmit authorization responses back to server 114 with respect to the authorization requests.

The use of payment cards for a broad spectrum of cashless transactions has become ubiquitous in the current economy, accounting for hundreds of billions of dollars in transactions during a single year. For example, MasterCard International Incorporated processes upwards of 160 million transactions per hour in over 230 countries. It should be appreciated that the amount of information and resources (e.g., technology assets) involved in performing and coordinating payment transactions, at any point in payment card transaction processing system 100 is enormous.

A payment network may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include gift cards, personalized gift cards, payment cards, letters of credit, checks, financial accounts, etc. Accordingly, a payment network relies on variety of resources, such as various hardware and/or software platforms, databases, internal networks, etc.

To carry out a file transfer from one party to another, Global File Transfer (GFT) takes advantage of in-place connectivity and may offer file transfer protocol (FTP) services. A file transfer may be carried out because of a relationship with a member and a vendor/third party. As will be appreciated by those of ordinary skill in the art, GFT is a system available from MasterCard International Incorporated wherein files are transferred over a payment network of the kind shown in FIG. 1, and is a non-limiting example of data file transfer via a payment network.

There are a number of methods of passing a file through a payment system; for example: a virtual private network (VPN) or the Internet—using a suitable secure technique for communicating data over the Internet, for example, an existing method such as MasterCard International Incorporated's MFE (MASTERCARD FILE EXPRESS) or the aforementioned SFTP technique or similar techniques. As will be appreciated by those of ordinary skill in the art, the same are generally representative of so-called Straight-Through-Processing (STP) techniques which enable electronic payments to flow seamlessly from, for example, a company's Accounts Payable system, through the banking infrastructure, and to a vendor's Accounts Receivable system. Note that in at least some instances, STP techniques can also be employed in connection with the above-discussed VPN file transfer. An STP Transaction Set was developed by the Electronic Payments Network and represents a widely adopted standardized format that may be employed in one or more embodiments. Those of ordinary skill in the art will also appreciate that MasterCard File Express is an example of an application (accessible online) which handles both the compression and encryption of data for transmission.

The encryption of data is one such feature/application/service that may be customized based on a vendor framework/product. For example, a payment network may implement pretty good privacy (PGP) data encryption and decryption for providing cryptographic privacy and authentication for data communications, such as that described previously.

Figure 2A:
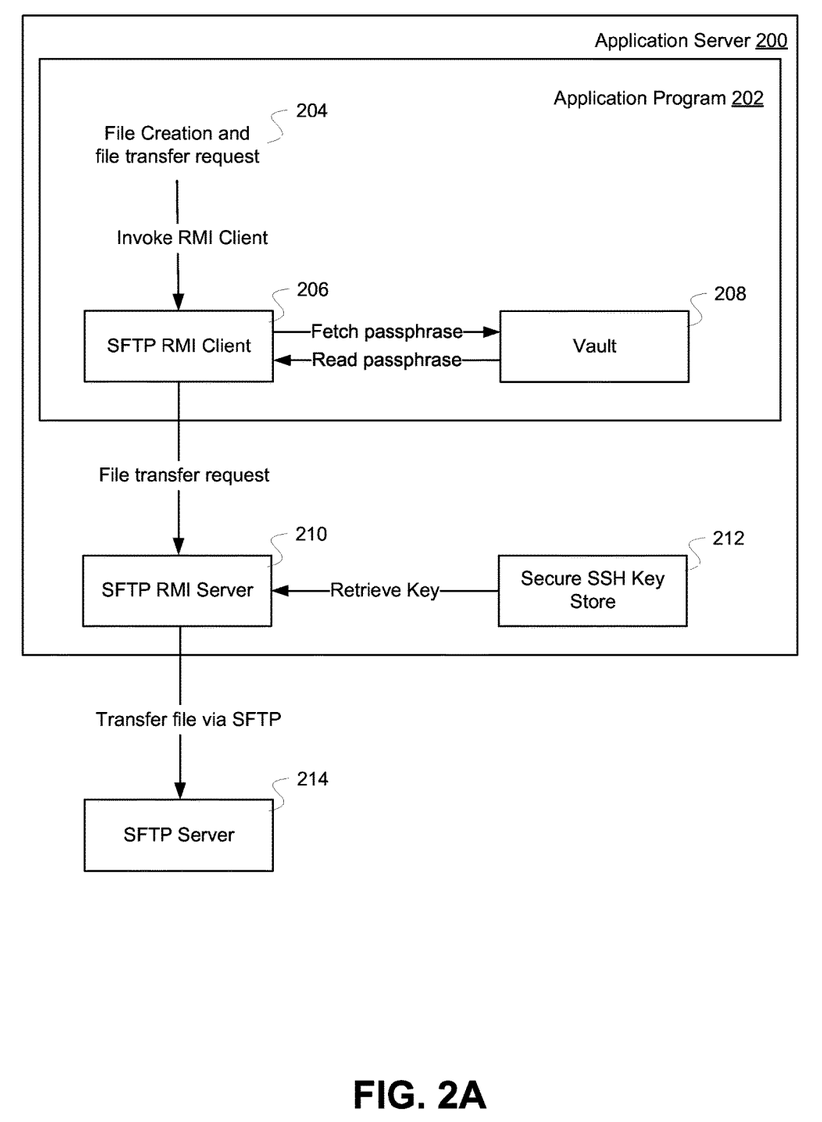
FIG. 2A illustrates an example application and application server architecture for implementing secure file transfer with secure SSH key authentication.

FIG. 2A illustrates an example file transfer architecture in accordance with various embodiments of the present disclosure. The file transfer architecture includes an application server 200, and within that application server 200, an application program 202. Application server 200 and application program 202 can communicate with a (remote) SFTP server 214 to effectuate secure file transfer in accordance with various embodiments. It should be noted that SFTP server 214 may be a payment network SFTP gateway server to which data files can be transferred in order to enter into the payment network enterprise file transfer system/solution, and out to, e.g., customer.

As described above, application program 202 may be an example of an application involving data transfer using SFTP techniques. Within application program 202, a data file may be created and a file transfer request initiated at 204. Thus, the RMI client (in this example, an SFTP RMI client 206) may be invoked.

It should be noted that various embodiments are implemented in Java, an object-oriented language, which means that the code is associated with a class of objects. An object is a simulated data structure which behaves according to the specifications of its class—the act of making Java code involves creating and altering these classes. Specific class behaviors are defined by snippets of code called "methods," and properties of objects and classes are defined by "variables." Java is utilized in various embodiments because Java is OS/platform agnostic and lends itself to use in architectures or environments having a plurality of OSs or platforms are used, such as Windows, Linux, Unix, AIX, etc.

Java's functionality comes from its application programming interface (API). It can handle complex data structures, sorting algorithms, networking protocols, classes and methods to create graphical user interfaces, and more. APIs are exposed between components using a Java Remote Method Invocation (RMI) interface. The Java RMI is an API that performs the object-oriented equivalent of remote procedure calls (RPC) with support for direct transfer of serialized Java classes and distributed garbage collection. Although various embodiments are described herein as being implemented using Java, other programming languages or schema may be used to implement the features described herein.

Referring back to FIG. 2A, invocation of SFTP RMI client 206 involves fetching and reading a passphrase from vault 208. As previously discussed, a vault or other secure repository, such as vault 208, can be utilized to securely store passphrases used to retrieve SSH keys to authenticate a file transfer. Access to vault 208, as also discussed above, is premised upon, e.g., an authentication ID used to authenticate a user to application server 200/application program 202. In other words, the process that has access to the SSH key passphrase is based on the identity used to run or execute the application.

The file transfer request initiated at 204 is passed to SFTP RMI server 210, which, if the proper passphrase has been retrieved, can be used to access the SSH key from secure SSH key store 212. It should be noted that the client (in this example, SFTP RMI client 206) calling the SFTP API has the passphrase in order to use the SSH key, but the client need not necessarily "see" the SSH key. That is, the SSH key can be considered to be "owned" by SFTP RMI server 210 that only it can access. Once the SSH key is retrieved, the file transfer request can be authenticated and the desired data file(s) can be transferred via SFTP to SFTP server 214.

It should be noted that SFTP RMI client 206 and SFTP RMI server 210 are both physical host platforms and resident application software engaged as either a client or server role in a file transfer/exchange. As utilized herein, these terms are intended to represent respective, entire logical entities. Similarly, vault 208 represents a secure data store and also a library with exposed methods for accessing secure tokens in that secure data store.

Figure 2B:
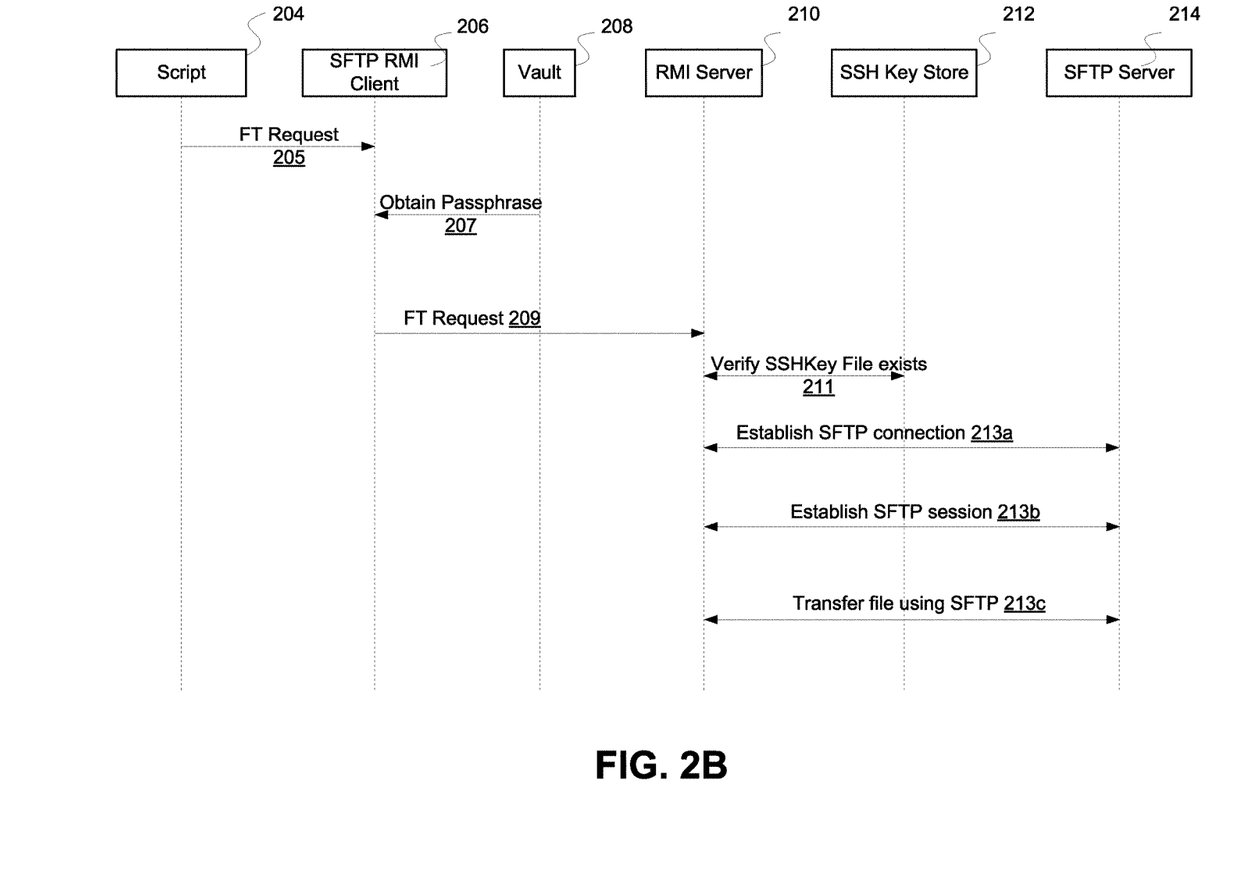
FIG. 2B is an example message flow diagram illustrating the message flow between system entities to achieve secure file transfer with secure SSH key authentication in the application and application server architecture of FIG. 2.

FIG. 2B illustrates an example message flow within elements of the file transfer architecture of FIG. 2A and will be described in conjunction with FIGS. 3A and 3B, which are flow charts illustrating example respective processes performed by client and server aspects of the file transfer architecture.

As can be appreciated in FIG. 2A, the SFTP file transfer service is implemented as an RMI (client-server) service. In accordance with one embodiment, a script is provided for interacting with the SFTP file transfer service. In particular, and as illustrated in FIG. 2B, SFTP RMI client 206 can be accessed by invoking a script 204 provided with certain required parameters. That is, script 204, e.g., a shell script or batch script, may have the following arguments: hostname, portnumber, sourcefilename, destinationfilename, username, sshkeyfilename, vault-label, passphrase. It should be noted that the term "required" in this context does not necessarily suggest that each of these parameters are always required for operation, but rather these or other parameters or sets of parameters may be required given the constraints of some particular embodiment or scenario.

SFTP RMI client 206 performs the provided parameter parsing along with the options, validation check and initiation of a file transfer request to SFTP RMI server 208 which will be discussed in greater detail below. When checking for the vault-label and/or passphrase parameters, the file transfer request may be aborted if neither the vault-label nor passphrase values are provided. On the other hand, if the vault-label is provided, but the passphrase is not, SFTP RMI client 206 will connect to vault 208 to fetch the passphrase for the provided vault-label parameter. In certain instances, the passphrase may have already been provided, in which case the file transfer can proceed without connecting to vault 208. If both the vault-label and passphrase are provided, precedence is given to the passphrase, i.e., SFTP RMI client 206 need not fetch the passphrase from vault 208, can simply use the provided passphrase for the file transfer request.

Script 204 calls or invokes SFTP RMI client 206 and initiates a file transfer request with the required parameters (message 205 of FIG. 2B). Application program 202 can be started as an RMI service running on a specified port, where script 204 will be communicating with SFTP RMI client 206. SFTP RMI client 206 validates the provided parameters for basic checks and validity. That is, SFTP RMI client 206 can perform basic validation (e.g., a NULL or empty check) of provided arguments/parameters and verify that required arguments/parameters are provided. An allowed values check may also be performed on the required parameters. Moreover, SFTP RMI client 206 checks if a passphrase is provided, and if not, it determines whether a vault-label is provided. It should be noted that within vault 208, passphrases are maintained in label-passphrase value pairs, where SFTP RMI client 206 can request the value (i.e., the passphrase itself) associated with a particular label used in script 204 (i.e., the aforementioned vault-label). Access to the passphrase/values in vault 208 can be pre-established or pre-configured based on the single sign-on identity/user authentication ID.

Figure 3A:
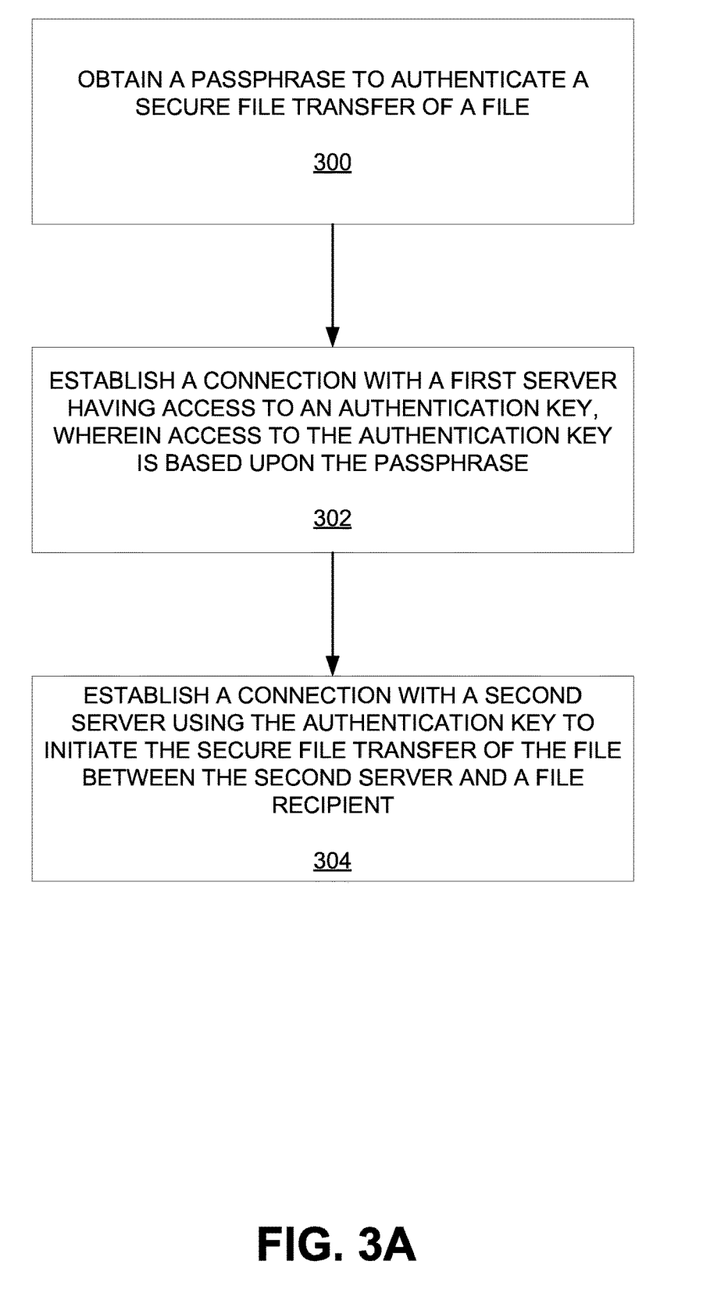
FIG. 3A is a flowchart illustrating example processes performed by a client to initiate a secure file transfer in accordance with various embodiments of the present disclosure.

From the perspective of SFTP RMI client 206, values are obtained from the parameters and vault 208 is accessed with a given label to obtain a passphrase for an SSH key to be used for authenticating a secure file transfer (message 207 of FIG. 2B; operation 300 of FIG. 3A).

Once the appropriate passphrase has been obtained, a connection is established with SFTP RMI server 210 by sending a file transfer request with all required values (message 209 of FIG. 2B; operation 302 of FIG. 3A). SFTP RMI server 210 owns the requisite SSH key for SFTP file transfer authentication, which is accessible pursuant to obtaining the correct passphrase. Thus, SFTP RMI server 210 also validates the required parameters for file transfer, which includes verifying that the proper SSH key file exists with SSH key store 212 (message 211 of FIG. 2B).

SFTP RMI server 210 then connects with SFTP server 214 using the provided SSH Key file, passphrase and other required parameters and the SFTP file transfer is initiated (operation 304 of FIG. 3A). In particular, an SFTP connection is established with SFTP server 214 (message 213a of FIG. 2B), an SFTP session is established (message 213b of FIG. 2B), and the file is transferred using SFTP to SFTP server 214 (message 213c of FIG. 2B).

Figure 3B:
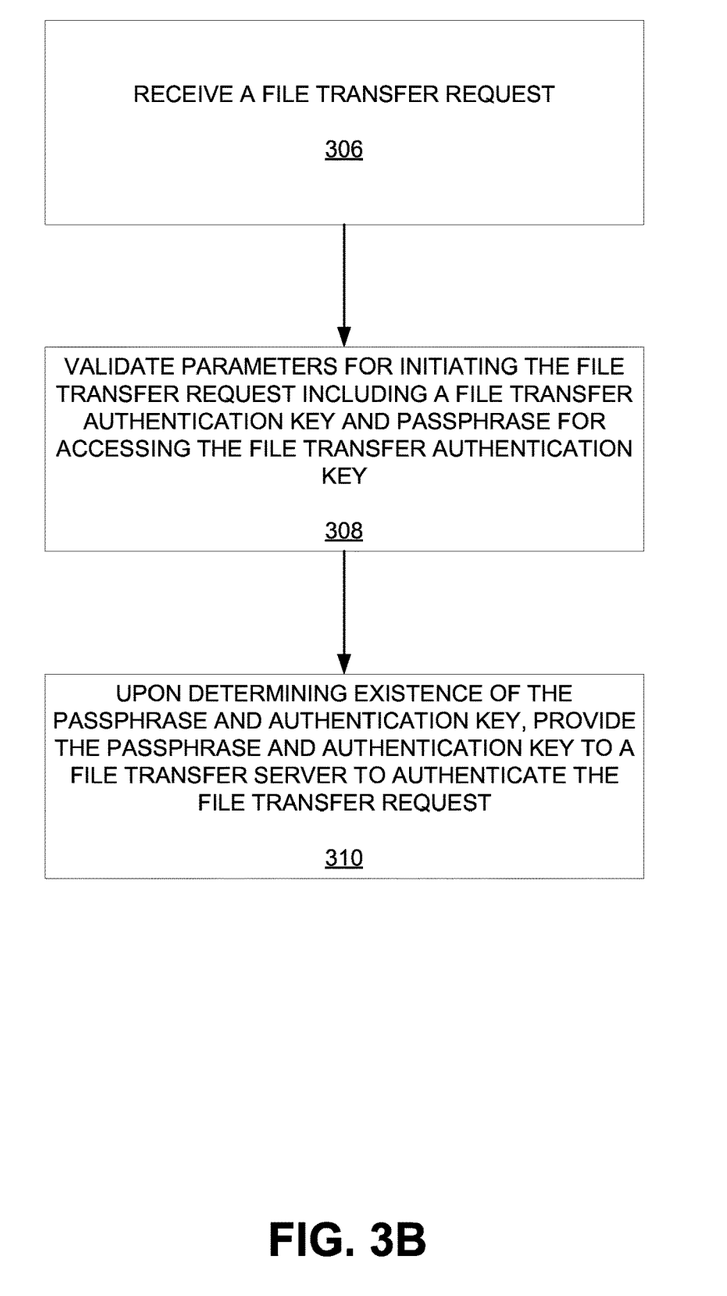
FIG. 3B is a flowchart illustrating example processes performed by a server to initiate a secure file transfer in accordance with various embodiments of the present disclosure.

From the perspective of SFTP RMI server 210, and upon receiving a file transfer request from SFTP API RMI client 206 (operation 306 of FIG. 3B), SFTP RMI server 210 validates the received parameters, i.e., checking for empty arguments (operation 308 of FIG. 3B). As discussed above, SFTP RMI client 206 invokes SFTP RMI server 210 with a file transfer request including the following required arguments: hostname, sourceFileName, destFileName, clientSSHKeyFile, username, passphrase. It should be noted that the vault-label argument/parameter is no longer an issue once SFTP RMI server 210 is invoked. Regarding the SSH key, SFTP RMI server 210 performs a validation procedure to determine the existence of an SSH key file in a configured key file directory. If the SSH key file is missing, an error exception is thrown.

If the SSH key file can be validated, i.e., a passphrase was obtained to authenticate the file transfer request, and the file transfer request is added to a file transfer queue (operation 310 of FIG. 3B). SFTP RMI sever 210 maintains a file transfer queue, where the size of the queue is configurable, and files can be added to the file transfer queue based on availability of space within the file transfer queue. An active file transfer list is maintained (also having a configurable size), where file transfer requests are added to the active file transfer list based upon availability of space therein. In the event the number of active transfers have reached a maximum active file transfer list amount, subsequent file transfer requests are made to wait for some configurable time to be retried, e.g., three times before aborting or throwing an exception. A file transfer request is removed from the file transfer queue upon being added to the active file transfer list.

SFTP RMI server 210 establishes connections with SFTP server 214 for active file transfer requests in the active file transfer list using the provided hostname, portnumber, SSH-Key file, username, and passphrase. SFTP RMI server 210 then obtains a session with the respective SFTP server with the given hostname, username and portnumber. The private SSH key file and passphrase are provided for authentication for the SFTP file transfer session. An SFTP channel is opened with SFTP server 214 to initiate the file transfer to SFTP server 214.

The actual file transfer is initiated between SFTP RMI server 210 and SFTP server 214 on the channel with sourceFileName, destinationFileName and mode (overwrite). The source file is transferred to its destination with a given destination file name on SFTP server 214. Once the file transfer is completed successfully, the file transfer request is removed from the active file transfer list, the session is disconnected, and the connection with SFTP server 214 is closed. It should be noted that file transfer status can be maintained for some amount of time, e.g., the last five days, which includes total file transfers, successful file transfers and file transfer failures. At any point, the system state can be monitored for any active transfers, failed transfers and successful transfers. Active transfer details (transfer request details, filename, start time) can also be monitored.

It should be noted that although various embodiments of the present disclosure have been presented and described in the context of payment card transaction file/data transfer, the disclosed concept of automated passphrase/secure key authentication is generally applicable, and other embodiments are contemplated for implementation in any other context to allow for more efficient application use and/or operation.

Figure 4:
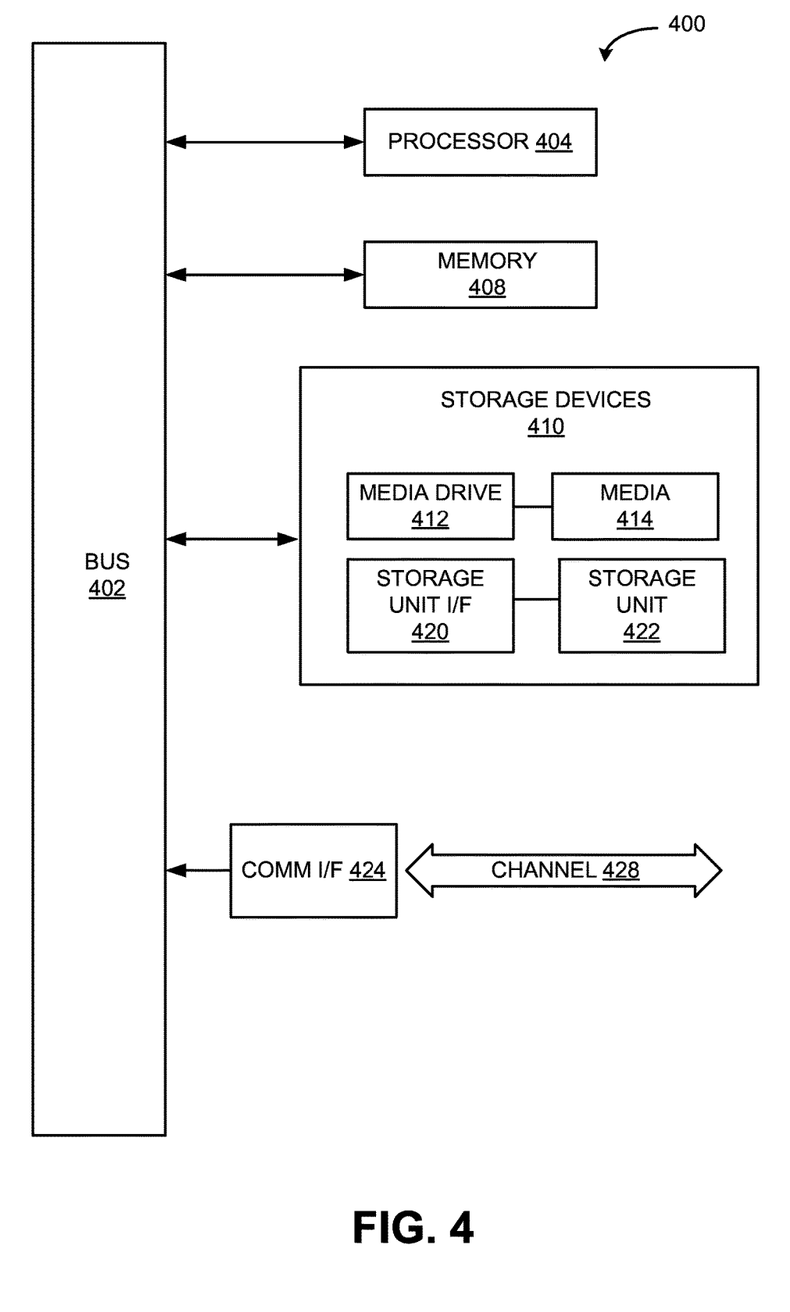
FIG. 4 illustrates an example computing component that may be used in implementing features of various embodiments of the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

FIG. 4 illustrates an example computing component 400, an example of which may be a processor for executing the business ecosystem tool used to implement various features and/or functionality of the systems and methods disclosed in the present disclosure. Computing component 400 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage devices 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage devices 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for supporting secure file transfer, the method comprising:
    upon authenticating a user to an application for a secure file transfer of a file using a user authentication ID, obtaining a passphrase from a secure repository based upon the user authentication ID for authenticating a user to an application requiring the secure file transfer of the file;
    upon authenticating the passphrase, establishing a first connection with a first server to retrieve an authentication key from a secure key store;
    sending the authentication key and the passphrase to a second server; and
    upon validating the authentication key and the passphrase, establishing a second connection with the second server to initiate the secure file transfer of the file between the second server and a file recipient;
    wherein the first server comprises a secure file transfer protocol (SFTP) remote method invocation (RMI) server; and
    wherein the authentication key remains hidden from the application requiring the secure file transfer of the file.

2. The method of claim 1, wherein the second server comprises an SFTP server communicatively connected to the file recipient.

3. The method of claim 1, wherein establishing the first connection with the first server comprises sending a file transfer request to the first server including a plurality of required arguments including a passphrase argument containing a value indicative of the passphrase.

4. The method of claim 1, wherein the authentication key comprises a secure shell (SSH) key.

5. The method of claim 1, wherein the first connection is established between the first server and an SFTP RMI client.

6. The method of claim 1, wherein the second connection is established between the second server and the first server.

7. An application server, comprising:
- a secure file transfer protocol (SFTP) remote method invocation (RMI) client component;
- a vault accessible by the SFTP RMI client to obtain a passphrase for authenticating a file transfer request by the application server, upon authenticating a user to an application using a user authentication ID and obtaining the passphrase based upon the user authentication ID;
- an SFTP RMI server;
- a secure authentication key store from which the SFTP RMI server obtains an authentication key determined upon authentication of the obtained passphrase;
- wherein the SFTP RMI server is communicatively connected to an SFTP server, the SFTP server being communicatively connected to an intended file recipient initiating a file transfer upon validating the authentication key and the obtained passphrase, wherein the authentication key and the obtained passphrase are sent to the SFTP server by the SFTP RMI server;
- wherein the application server comprises a processing device to implement an authorization and clearance of the file transfer request; and
- wherein the authentication key is owned by the SFTP RMI server and is hidden from the application server.

8. The application server of claim 7, wherein the SFTP RMI server is communicatively connected to an SFTP server for effectuating a file transfer based on the file transfer request between the application server and an intended file recipient.

9. The application server of claim 7, wherein the vault is automatically accessed by the SFTP RMI client based upon an authentication ID for authenticating a user to the application server.

* * * * *